US012683830B2

(12) United States Patent
Huang

(10) Patent No.: US 12,683,830 B2
(45) Date of Patent: Jul. 14, 2026

(54) PHYSICAL LAYER COLLISION AVOIDANCE DEVICE AND METHOD FOR PERFORMING EMERGENCY TRANSMISSION THEREOF

(71) Applicant: IC Plus Corp., Hsin-Chu (TW)

(72) Inventor: Chun-Ying Huang, Hsin-Chu (TW)

(73) Assignee: IC PLUS CORP., Hsin-Chu (TW)

( * ) Notice: Subject to any disclaimer, the term of this patent is extended or adjusted under 35 U.S.C. 154(b) by 594 days.

(21) Appl. No.: 18/177,757

(22) Filed: Mar. 3, 2023

(65) Prior Publication Data

US 2024/0243946 A1 Jul. 18, 2024

(30) Foreign Application Priority Data

Jan. 16, 2023 (TW) ................................. 112101676

(51) Int. Cl.
H04L 12/413 (2006.01)
H04L 12/40 (2006.01)

(52) U.S. Cl.
CPC ...... H04L 12/413 (2013.01); H04L 12/40143 (2013.01)

(58) Field of Classification Search
CPC ............. H04L 12/413; H04L 12/40143; H04L 47/245; H04L 1/0015; H04W 4/90
See application file for complete search history.

(56) References Cited

U.S. PATENT DOCUMENTS

| | | | | | |
|---|---|---|---|---|---|
| 5,920,701 | A | * | 7/1999 | Miller | H04L 1/1809 709/228 |
| 2013/0250758 | A1 | * | 9/2013 | Chen | H04W 48/06 370/230 |

| | | | | | |
|---|---|---|---|---|---|
| 2017/0201461 | A1 | * | 7/2017 | Cheng | H04L 43/16 |
| 2017/0230939 | A1 | * | 8/2017 | Rudolf | H04W 4/70 |
| 2017/0328997 | A1 | * | 11/2017 | Silverstein | H04B 1/3827 |

(Continued)

FOREIGN PATENT DOCUMENTS

| | | |
|---|---|---|
| CN | 107787044 | 3/2018 |
| CN | 111757286 | 10/2020 |

(Continued)

OTHER PUBLICATIONS

"Office Action of Taiwan Counterpart Application", issued on Jul. 14, 2023, p. 1-p. 10.

(Continued)

*Primary Examiner* — Hoang-Chuong Q Vu
(74) *Attorney, Agent, or Firm* — McClure, Qualey & Rodack, LLP

(57) ABSTRACT

Embodiments of the disclosure provide a physical layer collision avoidance (PLCA) device and a method for performing emergency transmission thereof. The method includes: in response to determining that the PLCA device enters an emergency transmission mode, finding a first PLCA device that is performing a corresponding first packet transmission; in response to determining that a first transmission priority of the first PLCA device is lower than a transmission priority of the PLCA device, suspending the first packet transmission of the first PLCA device; and in response to determining that it is the PLCA device's turn to perform a corresponding packet transmission, sending an emergency packet corresponding to the emergency transmission mode.

11 Claims, 3 Drawing Sheets

(56)  References Cited

U.S. PATENT DOCUMENTS

| | | | |
|---|---|---|---|
| 2018/0049211 A1* | 2/2018 | Chang .................. | H04W 72/56 |
| 2019/0363991 A1* | 11/2019 | Sostawa ............ | H04L 12/40156 |
| 2019/0394786 A1* | 12/2019 | Parron .................. | H04W 4/46 |
| 2020/0136857 A1* | 4/2020 | Yun .................. | H04L 12/40039 |
| 2020/0136993 A1 | 4/2020 | Yun et al. | |
| 2020/0322180 A1 | 10/2020 | Meier et al. | |
| 2021/0144099 A1 | 5/2021 | Meier et al. | |
| 2022/0256503 A1* | 8/2022 | Bhattacharjee ... | H04W 52/0216 |

FOREIGN PATENT DOCUMENTS

| | | |
|---|---|---|
| JP | 2021525473 | 9/2021 |
| KR | 20200049577 | 5/2020 |

OTHER PUBLICATIONS

Jihyeon Min et al., "Performance Enhancement of In-Vehicle 10BASE-T1S Ethernet Using Node Prioritization and Packet Segmentation", IEEE Access, Sep. 26, 2022, pp. 103286-103295, vol. 10.
Eunmin Choi et al., "High-Speed, Low-Latency In-Vehicle Network Based on the Bus Topology for Autonomous Vehicles: Automotive Networking and Applications", IEEE Vehicular Technology Magazine, Dec. 23, 2021, pp. 74-84, vol. 17, Issue 1.
"Office Action of Japan Counterpart Application", issued on Sep. 4, 2024, p. 1-p. 4.
Don Pannell et al: "Priority Support for PLCA", IEEE draft, Sep. 2018, pp. 1-68.
Sungkwon Park et al., "Two proposals for priority based PLCA", IEEE draft, Nov. 2018, pp. 1-22.
"Search Report of Europe Counterpart Application", issued on Sep. 6, 2023, pp. 1-10.

\* cited by examiner

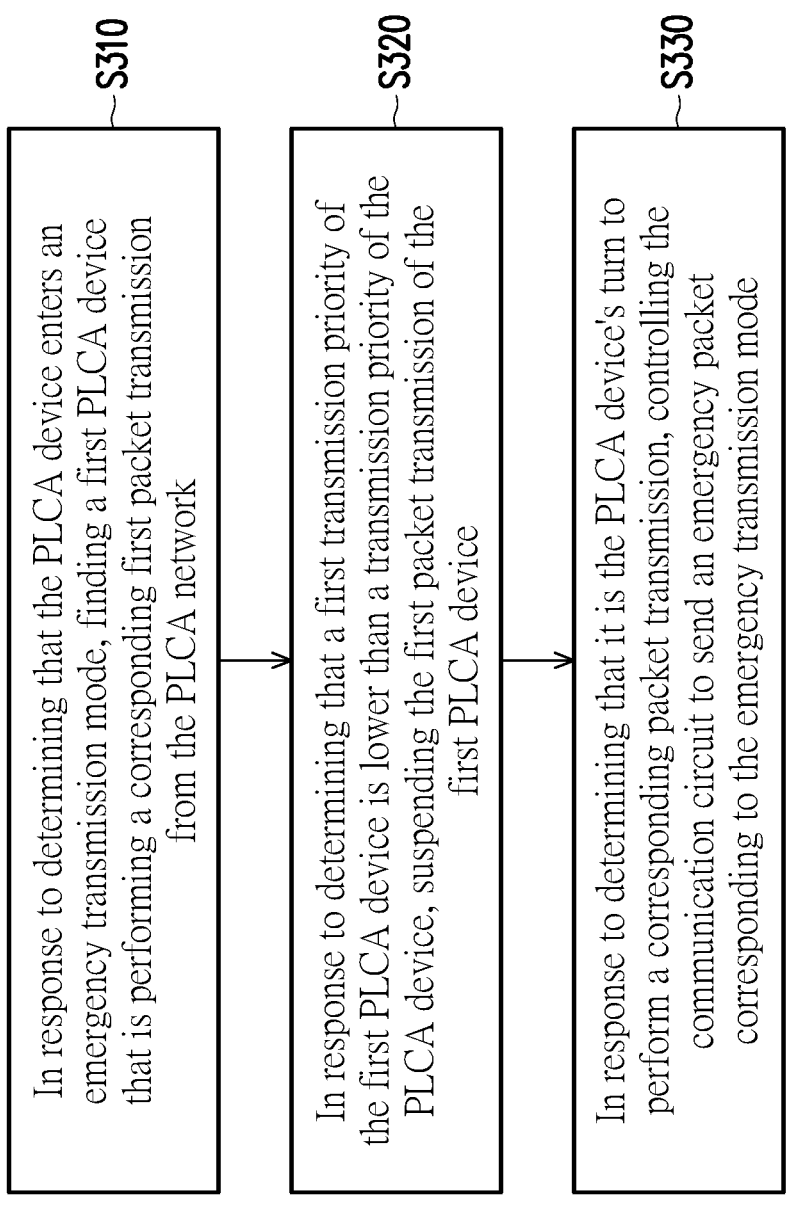

In response to determining that the PLCA device enters an emergency transmission mode, finding a first PLCA device that is performing a corresponding first packet transmission from the PLCA network ——S310

In response to determining that a first transmission priority of the first PLCA device is lower than a transmission priority of the PLCA device, suspending the first packet transmission of the first PLCA device ——S320

In response to determining that it is the PLCA device's turn to perform a corresponding packet transmission, controlling the communication circuit to send an emergency packet corresponding to the emergency transmission mode ——S330

FIG. 3

PHYSICAL LAYER COLLISION AVOIDANCE DEVICE AND METHOD FOR PERFORMING EMERGENCY TRANSMISSION THEREOF

CROSS-REFERENCE TO RELATED APPLICATION

This application claims the priority benefit of Taiwan application serial no. 112101676, filed on Jan. 16, 2023. The entirety of the above-mentioned patent application is hereby incorporated by reference herein and made a part of this specification.

BACKGROUND

Technical Field

The disclosure relates to a physical layer collision avoidance (PLCA) technology, and in particular relates to a physical layer collision avoidance device and a method for performing an emergency transmission in a physical layer collision avoidance network.

Description of Related Art

In the existing technology, 10BASE-TIS is expected to replace the existing multipoint network, such as the controller area network (CAN) bus. The CAN bus may preset identification information through the carrier sense multiple access with collision detection (CSMA/CD) protocol, and arbitrate priority during transmission, thereby reducing the transmission delay of data packets to achieve the goal of predictable transmission time.

Based on the IEEE 802.3cg-2019 standard. PLCA nodes share bandwidth evenly. Although the user may arrange the bandwidth by adjusting the maximum burst count so that some nodes have higher priority, these PLCA nodes with higher priority still need to wait for their own transmission opportunity (TO) to send data packets. This means that it may take a long time (for other nodes to complete the packet transmission) before the data packet is sent out.

SUMMARY

In view of this, the disclosure provides a physical layer collision avoidance device and a method for emergency transmission in a physical layer collision avoidance network, which may be used to solve the above technical problems.

An embodiment of the disclosure provides a physical layer collision avoidance device, which belongs to a physical layer collision avoidance network, in which the physical layer collision avoidance device includes a communication circuit and a controller. The controller is coupled to the communication circuit and is configured to perform the following operation. In response to determining that the physical layer collision avoidance device enters an emergency transmission mode, a first physical layer collision avoidance device that is performing a corresponding first packet transmission is found. In response to determining that a first transmission priority of the first physical layer collision avoidance device is lower than a transmission priority of the first physical layer collision avoidance device, the first packet transmission of the first physical layer collision avoidance device is suspended. In response to determining that it is the turn of the physical layer collision avoidance device to perform a corresponding packet transmission, the communication circuit is controlled to send at least one emergency packet corresponding to the emergency transmission mode.

An embodiment of the disclosure provides a method for performing an emergency transmission in a physical layer collision avoidance network, which is suitable for a physical layer collision avoidance device, including the following operation. In response to determining that the physical layer collision avoidance device enters an emergency transmission mode, a first physical layer collision avoidance device that is performing a corresponding first packet transmission is found. In response to determining that a first transmission priority of the first physical layer collision avoidance device is lower than a transmission priority of the first physical layer collision avoidance device, the first packet transmission of the first physical layer collision avoidance device is suspended. In response to determining that it is the turn of the physical layer collision avoidance device to perform a corresponding packet transmission, at least one emergency packet corresponding to the emergency transmission mode is sent.

BRIEF DESCRIPTION OF THE DRAWINGS

FIG. 3 is a flowchart of a method for performing an emergency transmission in a PLCA network according to an embodiment of the disclosure.

DETAILED DESCRIPTION OF DISCLOSED EMBODIMENTS

Figure 1:
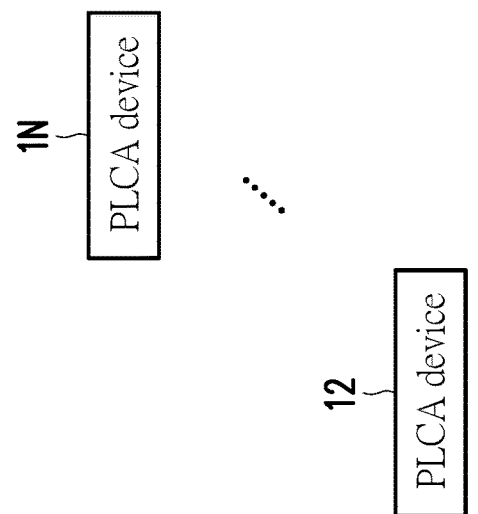
FIG. 1 is a schematic diagram of a PLCA network according to an embodiment of the disclosure.
Figure 1:
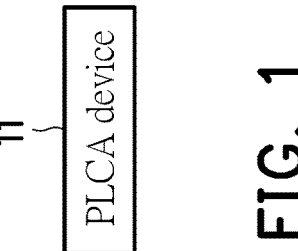
Figure 1:
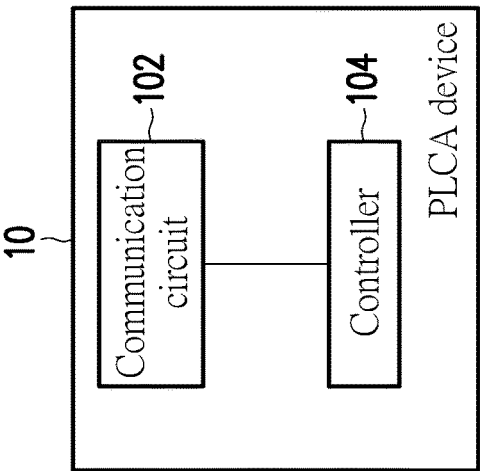

Referring to FIG. 1. FIG. 1 is a schematic diagram of a PLCA network according to an embodiment of the disclosure. In FIG. 1, a PLCA network 100 includes PLCA devices 10 to 1N, in which the PLCA devices 10 to 1N may have the same or similar structure. Taking the PLCA device 10 as an example, it includes a communication circuit 102 and a controller 104.

In one embodiment, the communication circuit 102 may be used, for example, to implement communication between the PLCA device 10 and other PLCA devices in the PLCA network 100, and the communication circuit 101 may be implemented as a communication module with corresponding communication functions according to the communication protocol used for packet exchange between the PLCA devices 10 to 1N.

In one embodiment, the PLCA devices 10 to 1N may, for example, use the CSMA/CD protocol for packet exchange. In this case, the communication circuit 102 may, for example, be implemented as a communication module with CSMA/CD function, but not limited thereto.

The controller 104 is coupled to the communication circuit 102 and may be a general purpose processor, a special purpose processor, a conventional processor, a digital signal processor, multiple microprocessors, one or more combined digital signal processing microprocessor, a microcontroller, an application specific integrated circuit (ASIC), a field programmable gate array (FPGA), any other type of integrated circuit, state machine, advanced RISC machine (ARM) based processor and the like.

In FIG. 1, the structure of the PLCA devices 11 to 1N may refer to the relevant description of the PLCA device 10, and will not be repeated herein.

In the embodiment of the disclosure, the PLCA devices 10 to 1N respectively perform corresponding packet transmission in the PLCA network 100 according to the corresponding transmission opportunity.

Figure 2:
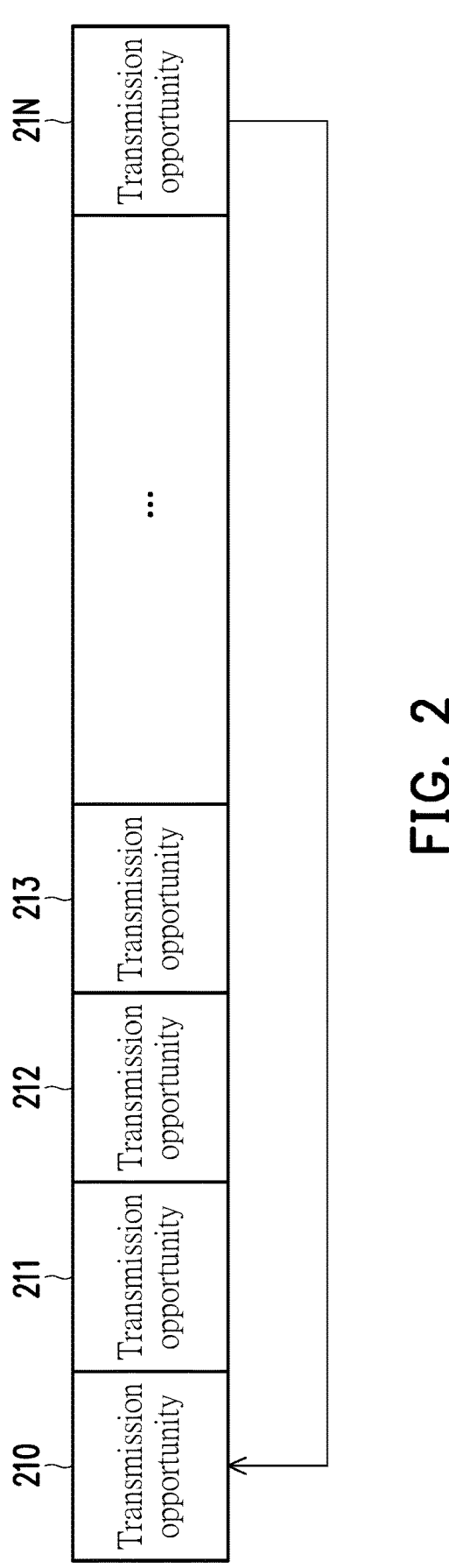
FIG. 2 is a schematic diagram of a PLCA mechanism according to an embodiment of the disclosure.

Referring to FIG. 2. FIG. 2 is a schematic diagram of a PLCA mechanism according to an embodiment of the disclosure. In the scenario shown in FIG. 2, before the PLCA devices 10 to 1N actually operate the PLCA mechanism, the corresponding node identities of the PLCA devices 10 to 1N may be manually set, or the node identities of each of the PLCA devices 10 to 1N in the PLCA network 100 is determined based on a specific mechanism.

In the embodiment of the disclosure, it is assumed that the node identities of each of the PLCA devices 10 to 1N are expressed by a corresponding node number, and the node numbers of each of the PLCA devices 10 to 1N may correspond to the transmission priorities of each of the PLCA devices 10 to 1N in the PLCA network 100.

In one embodiment, a PLCA device with a lower node number may, for example, have a higher transmission priority, but not limited thereto. For ease of description, it is assumed below that the node numbers of the PLCA devices 10 to 1N are respectively node numbers 0 to N, but this is only for example and not intended to limit the possible implementation of the disclosure.

In FIG. 2, since the node numbers of the PLCA devices 10 to 1N are respectively assumed to be node numbers 0 to N, this means that the transmission priorities of the PLCA devices 10 to 1N are sequentially decreased. In this case, the transmission opportunities 210 to 21N of the PLCA devices 10 to 1N are arranged sequentially when the PLCA mechanism is operating.

In this case, when the PLCA mechanism is operating, the PLCA devices 10 to 1N are sequentially transmitted at the corresponding transmission opportunities, and after the transmission opportunity 21N corresponding to the PLCA device 1N ends (e.g. the PLCA device with the lowest transmission priority), it will be the turn for the transmission opportunity 210 corresponding to the PLCA device 10 again (e.g., the PLCA device with the highest transmission priority). Moreover, each of the PLCA devices 10 to 1N may determine which PLCA device the current transmission opportunity is corresponding to.

In one embodiment, when one of the PLCA devices 10 to 1N enters the emergency transmission mode, if this PLCA device is not the PLCA device corresponding to the current transmission opportunity, this PLCA device may need to wait a long time to transmit in the corresponding transmission opportunity.

For example, assuming that the PLCA device 11 enters the emergency transmission mode when the PLCA device 13 executes the corresponding transmission opportunity 213, the PLCA device 11 needs to wait for the PLCA devices 13 to 1N, and 10 to complete the corresponding transmission opportunities 213 to 21N, and 210 in sequence, then the packet corresponding to the emergency transmission mode may be sent when executing the transmission opportunity 211 corresponding to the PLCA device 11. Moreover, even if it is the turn of the PLCA device 11 entering the emergency transmission mode to execute the corresponding transmission opportunity 211, the transmission time executed by the PLCA device 11 is also limited by the preset maximum transmission time (e.g., the above-mentioned maximum burst count), therefore, it may not be possible to completely send the packet corresponding to the emergency transmission mode.

In view of this, the disclosure provides a method for emergency transmission in the PLCA network, which may be used to solve the above technical problems. This is further described below.

Referring to FIG. 3, FIG. 3 is a flowchart of a method for performing an emergency transmission in a PLCA network according to an embodiment of the disclosure. In an embodiment of the disclosure, the method in FIG. 3 may be executed by any one of the PLCA devices 10 to 1N in FIG. 1. For the ease of description, it is assumed below that the steps in FIG. 3 are executed by the PLCA device 10, and the details of the steps in FIG. 3 are described below in combination with the contents of FIG. 1.

First, in step S310, in response to determining that the PLCA device 10 enters the emergency transmission mode, the controller 104 finds the first PLCA device from the PLCA network 100 that is performing the corresponding first packet transmission.

As mentioned above, each of the PLCA devices 10 to 1N may determine which PLCA device the current transmission opportunity is corresponding to. Based on this, in one embodiment, the controller 104 may determine the current transmission opportunity, and accordingly determine the first PLCA device that is currently performing the corresponding first packet transmission.

Taking FIG. 2 as an example, assuming that the controller 104 determines that the current transmission opportunity is the transmission opportunity 211, the controller 104 may determine that the PLCA device 11 is the first PLCA device currently performing the corresponding first packet transmission. For another example, assuming that the controller 104 determines that the current transmission opportunity is the transmission opportunity 21N, the controller 104 may determine that the PLCA device 1N is the first PLCA device currently performing the corresponding first packet transmission, but not limited thereto.

In addition, in the scenario of FIG. 2, if the controller 104 determines that the current transmission opportunity is the transmission opportunity 210 belonging to the PLCA device 10, the controller 104 may determine that it is the turn of the PLCA device 10 to perform packet transmission, but not limited thereto.

Next, in step S320, in response to determining that the first transmission priority of the first PLCA device is lower than the transmission priority of the PLCA device 10, the controller 104 suspends the first packet transmission of the first PLCA device.

As mentioned above, the transmission priorities of each of the PLCA devices 10 to 1N may be expressed as the node numbers of each of the PLCA devices 10 to 1N, and a lower node number corresponds to a higher transmission priority. Based on this, the controller 104 may, for example, determine whether the first transmission priority of the first PLCA device is lower than the transmission priority of the PLCA device 10 by determining whether the node number of the first PLCA device is higher than the node number of the PLCA device 10.

In the first embodiment, in response to determining that the node number of the first PLCA device is lower than the node number of the PLCA device, the controller 104 may determine that the first transmission priority of the first PLCA device is higher than the transmission priority of the PLCA device 10. In this case, the controller 104 may, for example, wait for the first PLCA device to complete the first packet transmission, but not limited thereto.

In the second embodiment, in response to determining that the node number of the first PLCA device is higher than the node number of the PLCA device 10, the controller 104 may determine that the first transmission priority of the first PLCA device is lower than the transmission priority of the PLCA device 10. In this case, the controller 104 may suspend the first packet transmission of the first PLCA device. In one embodiment, the controller 104 may, for example, control the communication circuit 102 to send an interference packet in the PLCA network 100 to suspend the first packet transmission of the first PLCA device. In this case, the transmission opportunity corresponding to the first PLCA device may be ended early so that the next transmission opportunity may start early. In this way, the effect of shortening the waiting time of the PLCA device 10 may be achieved, so that the PLCA device 10 may execute the corresponding transmission opportunity earlier.

In addition, after suspending the first packet transmission of the first PLCA device, the controller 104 may then find one or more second PLCA devices from the PLCA network 100 that perform the corresponding second packet transmission after the first PLCA device, and determine whether the second transmission priorities of each of the second PLCA devices are lower than the transmission priority of the PLCA device 10.

In one embodiment, in response to determining that the second transmission priorities of each of the second PLCA devices are lower than the transmission priority of the PLCA device 10, the controller 104 may suspend the second packet transmissions corresponding to each of the second PLCA devices.

For example, the controller 104 may send a corresponding interference packet in the PLCA network 100 through controlling the communication circuit 102 to suspend the second packet transmissions corresponding to each of the second PLCA devices when each of the second PLCA devices are performing the corresponding second packet transmissions.

Taking FIG. 2 as an example, it is assumed that the controller 104 determines that the current transmission opportunity is the transmission opportunity 211 corresponding to the PLCA device 11. In this case, after the controller 104 determines that the transmission priority of the PLCA device 11 is lower than the transmission priority of the PLCA device 10, the controller 104 may control the communication circuit 102 to send an interference packet in the PLCA network 100 to suspend the packet transmission of the PLCA device 11. In this way, the transmission opportunity 211 may be ended earlier and the transmission opportunity 212 may be started earlier, thereby it is the turn of the transmission opportunity 210 sooner, so that the PLCA device 10 may send the emergency packet corresponding to the emergency transmission mode.

Next, after the controller 104 determines that the transmission priority of the PLCA device 12 (i.e., the PLCA device that performs the corresponding packet transmission after the PLCA device 11) is lower than the transmission priority of the PLCA device 10, the controller 104 may control the communication circuit 102 to send an interference packet in the PLCA network 100 to suspend the packet transmission of the PLCA device 12. In this way, the transmission opportunity 212 may be ended earlier and the transmission opportunity 213 may be started earlier.

Based on the above principles, the controller 104 may suspend the packet transmissions of each of the PLCA devices 13 to 1N with the corresponding interference packet when the PLCA devices 13 to 1N execute the corresponding transmission opportunities 213 to 21N. In this way, the waiting time of the PLCA device 10 may be shortened, and the transmission opportunity 210 of the PLCA device 10 may be started earlier.

In step S330, in response to determining that it is the turn of the PLCA device 10 to perform the corresponding packet transmission (i.e., it is the turn of the transmission opportunity corresponding to the PLCA device 10), the controller 104 controls the communication circuit 102 to send the emergency packet corresponding to the emergency transmission mode.

In one embodiment, the PLCA device 10 may continuously transmit the emergency packets until all the emergency packets are transmitted. In other words, the sum of the transmission time used by the PLCA device 10 for transmitting the emergency packets may be greater than the preset maximum transmission time of the PLCA device 10, but not limited thereto.

In one embodiment, in response to determining that the packet transmission corresponding to the emergency packet has been completed, the controller 104 may control the PLCA device 10 to exit the emergency transmission mode. In this case, the PLCA device 10 may stop suspending the packet transmission of other PLCA devices with interference packets, and let the PLCA devices 10 to 1N operate based on the conventional PLCA mechanism, but not limited thereto.

In order to make the concept of the disclosure easier to understand, FIG. 2 is taken as an example for further description below. In the third embodiment, assuming that the PLCA device 12 enters the emergency transmission mode when the PLCA device 13 executes the transmission opportunity 213, the PLCA device 12 may suspend the packet transmission corresponding to at least one of the PLCA devices 13 to 1N (whose transmission priority is lower than the PLCA device 12) according to the previous teaching, so as to shorten at least one of the transmission opportunities 213-21N.

Then, after the transmission opportunity 21N ends, the transmission opportunity 210 will start again. In this case, since the transmission priority of the PLCA device 10 is higher than that of the PLCA device 13, the PLCA device 13 will wait for the PLCA device 10 to complete the corresponding packet transmission. That is, the PLCA device 13 does not attempt to shorten the transmission opportunity 210 by, for example, sending interference packets. Similarly, since the transmission priorities of the PLCA devices 11 and 12 are higher than that of the PLCA device 13, the PLCA device 13 will wait for the PLCA devices 11 and 12 to complete the corresponding packet transmission. That is, the PLCA device 13 does not attempt to shorten the transmission opportunities 211 and 212 by, for example, sending interference packets.

After the transmission opportunity 212 ends, the PLCA device 13 may send the required emergency packet in the corresponding transmission opportunity 213. Since at least one of the transmission opportunities 213 to 21N is shortened according to the above teaching, the transmission opportunity 213 may be started earlier, and the waiting time of the PLCA device 13 may be shortened.

To sum up, the method provided by the embodiment of the disclosure allows the PLCA device entering the emergency transmission mode to timely suspend the packet transmission of other PLCA devices with lower transmission priority, thereby achieving the effect of shortening the waiting time.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A physical layer collision avoidance device, belonging to a physical layer collision avoidance network, wherein the physical layer collision avoidance device comprises:

a communication circuit; and a controller, coupled to the communication circuit and configured to:

in response to determining that the physical layer collision avoidance device enters an emergency transmission mode, find a first physical layer collision avoidance device that is performing a corresponding first packet transmission;

in response to determining that a first transmission priority of the first physical layer collision avoidance device is lower than a transmission priority of the physical layer collision avoidance device, suspend the first packet transmission of the first physical layer collision avoidance device;

suspend the first packet transmission of the first physical layer collision avoidance device by controlling the communication circuit to send an interference packet in the physical layer collision avoidance network; and in response to determining that it is the physical layer collision avoidance device's turn to perform a corresponding packet transmission, control the communication circuit to send at least one emergency packet corresponding to the emergency transmission mode.

2. The physical layer collision avoidance device according to claim 1, wherein the physical layer collision avoidance network comprises the physical layer collision avoidance device and at least one other physical layer collision avoidance device, and the physical layer collision avoidance device and the at least one other physical layer collision avoidance device respectively perform corresponding packet transmission in the physical layer collision avoidance network according to corresponding transmission opportunities.

3. The physical layer collision avoidance device according to claim 2, wherein the controller is configured to:

determine a current transmission opportunity, and accordingly determine the first physical layer collision avoidance device that is currently performing the corresponding first packet transmission.

4. The physical layer collision avoidance device according to claim 3, wherein the controller is configured to:

in response to determining that the current transmission opportunity belongs to the physical layer collision avoidance device, determine that it is the physical layer collision avoidance device's turn to perform the packet transmission.

5. The physical layer collision avoidance device according to claim 2, wherein the physical layer collision avoidance device and the at least one other physical layer collision avoidance device each have a corresponding node number, and the controller is configured to:

in response to determining that the node number of the first physical layer collision avoidance device is higher than the node number of the physical layer collision avoidance device, determine that the first transmission priority of the first physical layer collision avoidance device is lower than the transmission priority of the physical layer collision avoidance device;

in response to determining that the node number of the first physical layer collision avoidance device is lower than the node number of the physical layer collision avoidance device, determine that the first transmission priority of the first physical layer collision avoidance device is higher than the transmission priority of the physical layer collision avoidance device.

6. The physical layer collision avoidance device according to claim 1, wherein the controller is further configured to:

in response to determining that the first transmission priority of the first physical layer collision avoidance device is higher than the transmission priority of the physical layer collision avoidance device, wait for the first physical layer collision avoidance device to complete the first packet transmission.

7. The physical layer collision avoidance device according to claim 1, wherein after suspending the first packet transmission of the first physical layer collision avoidance device, the controller is further configured to:

find at least one second physical layer collision avoidance device from the physical layer collision avoidance network for performing a corresponding second packet transmission after the first physical layer collision avoidance device; and in response to determining that second transmission priorities of each of the second physical layer collision avoidance devices are lower than the transmission priority of the physical layer collision avoidance device, suspend the second packet transmission corresponding to each of the second physical layer collision avoidance devices.

8. The physical layer collision avoidance device according to claim 7, wherein the controller is configured to:

suspend the second packet transmission corresponding to each of the second physical layer collision avoidance devices by controlling the communication circuit to send a corresponding interference packet in the physical layer collision avoidance network when each of the second physical layer collision avoidance devices performs the corresponding second packet transmission.

9. The physical layer collision avoidance device according to claim 1, wherein a sum of transmission time of the at least one emergency packet is greater than a preset maximum transmission time of the physical layer collision avoidance device.

10. The physical layer collision avoidance device according to claim 1, wherein the controller is further configured to:

in response to determining that the packet transmission corresponding to the at least one emergency packet has been completed, exit the emergency transmission mode.

11. A method for performing an emergency transmission in a physical layer collision avoidance network, suitable for a physical layer collision avoidance device, comprising:

in response to determining that the physical layer collision avoidance device enters an emergency transmission mode, finding a first physical layer collision avoidance device that is performing a corresponding first packet transmission;

in response to determining that a first transmission priority of the first physical layer collision avoidance device is lower than a transmission priority of the physical layer collision avoidance device, suspending the first packet transmission of the first physical layer collision avoidance device;

suspending the first packet transmission of the first physical layer collision avoidance device by sending an interference packet in the physical layer collision avoidance network; and in response to determining that it is the physical layer collision avoidance device's turn to perform a corresponding packet transmission, sending at least one emergency packet corresponding to the emergency transmission mode.

* * * * *